March 28, 1961 W. R. LANGE 2,976,636
THREE-DIMENSIONAL OPTO-ROUTER
Filed Nov. 22, 1955
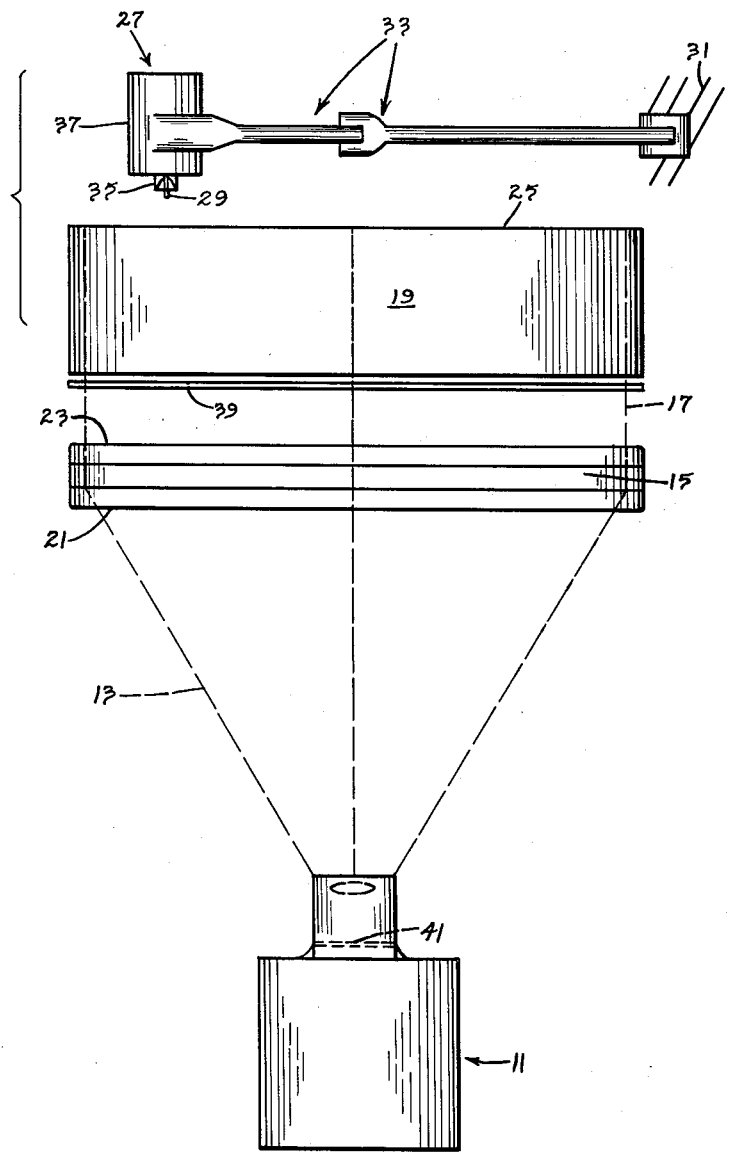
INVENTOR.
WILLIAM R. LANGE

United States Patent Office 2,976,636
Patented Mar. 28, 1961

2,976,636

THREE-DIMENSIONAL OPTO-ROUTER

William R. Lange, 39 Rooney Lane, Westbury, N.Y.

Filed Nov. 22, 1955, Ser. No. 548,554

9 Claims. (Cl. 41—25)

(Granted under Title 35, U.S. Code (1952), sec. 266)

The invention described herein may be manufactured and used by or for the Government of the United States of America for governmental purposes without the payment of any royalties thereon or therefor.

This invention relates to improvements in means and methods for three-dimensional reproduction of complex solids and more particularly pertains to improvements in means and methods for cutting three-dimensional shapes into transparent material such as map models.

A three-dimensional map model is a representation of terrain features having vertical extent, in contrast to conventional flat maps wherein terrain features such as mountains are depicted by such means as contour lines or color differentiation between different elevations.

There are numerous known methods of producing such a three-dimensional map model. Contour pantographs move a tracing stylus in a groove that is the contour line of an etched zinc contour plate. A follower stylus, a revolving power driven cutter that can be height-adjusted to correspond to any given line on the contour plate, cuts into a block of laminated plastic sheets. Each sheet represents one contour interval. Thus an operator, by causing the tracing stylus to follow in the contour line groove in the etched zinc contour plate, and by setting the follower stylus to a corresponding height as represented by the contour line being traced, can produce in the laminated sheet a three-dimensional representation of the terrain represented by the contour plate. This will produce a stepped arrangement on the laminated sheet, which is thereafter filled in with modelling clay to provide a realistic transition between adjacent contour levels.

Another known method of three-dimensional direct cutting is the jig saw or cut-all technique, wherein plane figures are cut in steps, which are then aligned and stacked to form the three-dimensional shape. Still another technique employs the contour router, wherein the operator scans a plane figure and remotely routs a similar shape in a block of solid material.

The disadvantages of the known methods of producing three-dimensional map models are numerous. The contour pantograph requires maintenance of a running inventory of input information, so that the operator knows which areas have or have not been cut out on the model. In addition, the contour pantograph has the inherent inaccuracy of tracer-follower methods of cutting, requires separate equipment that must be aligned to check accuracy, and generally is a device demanding the provision of accurately machined and therefore expensive components.

The jig saw or cut-all method requires skilled labor to stack and align the cut strips produced, a procedure that is a time-consuming and consequently expensive additional operation. Inaccuracies of alignment tend to be magnified, and separate costly equipment is required to check alignment and depth of cut. With the contour router, a running inventory on input information must be maintained, so that the operator can know which areas have or have not been cleared on the mold, highly skilled operating and maintaining personnel are required to maintain the equipment at tolerable levels of accuracy, and the device is inordinately bulky, heavy and expensive.

These disadvantages are substantially overcome by the subject device and the method thereof, which applies an opto-mechanical technique of transforming images directly into complex three-dimensional shapes from solid or laminated blocks.

The principal object of this invention is to provide a device and method for the three-dimensional reproduction of complex solids.

Another object is to provide a device and method for cutting three-dimensional shapes into transparent material such as map models.

A further object is to provide a device and method for fabricating three-dimensional map models from two-dimensional maps.

Other objects and many of the attendant advantages of this invention will be readily appreciated as the same becomes better understood by reference to the following detailed description when considered in connection with the accompanying drawings wherein the single figure is a diagrammatic representation of a three-dimensional opto-router, showing a preferred embodiment of the invention.

A conventional conic projection system 11 comprises a reflector, projection lamp, condensing lens and projection lens adapted to provide a divergent beam 13. Collimating lens 15 is located at its focal length (f) from the projection lens to convert beam 13 into a parallel projection 17 directed to the transparent cutting material 19, such collimating lens substantially eliminating distortion. The collimating lens 15 is further provided with facing sheets of plate glass 21 and 23, which are coated to reduce reflection and which further serve to support and protect the faces of the collimating lens.

The cutting material 19 is provided with a thin translucent coating or frosted surface 25 on the face thereof distal the projector. A router 27 includes a cutting tool 29 suspended from a support 31 through x and z sense deflection linkages 33 and a y or depth sense microadjustment linkage 35 carried by the head element 37.

The transparency 39 can be located in the device between the collimating lens 15 and the cutting material 19, preferably adjacent the latter, to provide a one-to-one ratio between the transparency and the cut. Alternatively, a transparency 41 can be located in the device between the condensing lens and the projection lens of the conic projection system to provide a ratio other than one-to-one between the transparency and the cut.

Preferably, the transparent material 19 is free from optical distortion producing stresses and other inhomogeneities, so that the undistorted parallel rays 17 can be transmitted through the transparent material 19 to the translucent surface 25 that provides the screen onto which the image is projected and viewed or scanned. The cutting tool or router can be of the continuous duty high speed type, and can be supported on minimum y deflection linkages with freedom of movement in the standard x and z senses, as shown diagrammatically in the drawing by the joined cantilever. The variable micro-inch depth selector 35 provides means to vary the depth of cut into the material 19, and a suitable waste removal system (not shown) of the blower or vacuum type can include a nozzle applied directly over the routing tool to assure maintenance of a clear working surface that avoids obscuring of any of the image.

In operation, the system and method provide means to project images onto a surface without distortion, such surface then being used as the routing surface. The projection lamp provides the light for projecting an image through the transparent material 19 onto the surface 25 of the cutting material. The condensing lenses concentrate the light from the projection lamp and a reflector placed in back of the lamp recovers the light emanating from the rear of the lamp. The light rays then pass through the projection lens, which is located at the focal point of the collimating lens 15 which in turn directs the light into a parallel beam of uniform cross-section. This parallel beam of light then passes through the transparency 39, causing the projection of a collimated image which proceeds through the thickness of the transparent material 19 and falls onto the screen or translucent surface 25, there producing an image that is used as the pattern for routing out three-dimensional shapes.

The router is a conventional high speed drill, supported on linkages 33 that allow complete $x$ and $z$ sense coverage of the plane area to be routed. Depth of cut is introduced by means of the adjustable micro-inch depth selector 35 attached to the cutting assembly.

As an alternative to the moving router assembly system described above, the combination of the cutting material and the transparency can be moved and the router retained fixed in all or some senses to introduce the necessary relative motion required for cutting.

The device and the method described above afford numerous advantages over previous techniques. The subject system and method not only present a direct cutting process, but provide means of checking $x$, $y$ and $z$ error immediately. The projected image remains after the routine operation has been performed, thus affording a direct check of the $x$ and $z$ senses, and the depth of cut can be checked by reference to the micrometer attachment. No error is introduced due to the linkage or the electrical transfer of data from the source to the cutting surface. The overall operational time required for cutting and checking is reduced, the tedious, error-introducing, a time-consuming process of alignment being eliminated. In addition, operational training requirements are minimal, as compared with other methods of three-dimensional cutting. Instead of the prior need to maintain a running inventory as to which part of the shape had or had not been cut, the actual cutting material maintained directly in front of the operator permits him to easily follow the outlines of shapes to be cut. It is also to be noted that, compared to devices such as the contour router, the weight and size of equipment is reduced substantially. Compared to electrical scan-follower systems, maintenance of equipment is minimized.

Obviously many modifications and variations of the present invention are possible in the light of the above teachings. It is therefore to be understood that within the scope of the appended claims the invention may be practiced otherwise than as specifically described.

I claim:

1. A three dimensional opto router, comprising a conic projection system, a transparent cutting material in spaced alignment with said conic projection system, a contour negative transparency secured to the lower end of said cutting material, a collimating lens mounted at its focal length between said conic projection system and negative for projecting through the cutting material the rays obtained as a plurality of parallel rays, a thin translucent coating on said transparent cutting material to make the parallel rays visible, and a router including a depth adjustable cutting tool mounted over said transparent cutting material to follow the negative image projected directly on the transparent cutting material whereby a three dimensional object is obtained directly.

2. A three-dimensional opto router comprising a transparent cutting material having opposed faces, means spaced from one face of said cutting material imaging an object thereon, and means spaced from the other face of said cutting material and adapted to rout the projection of such object in the other face of said cutting material in three principal senses.

3. A three-dimensional opto router comprising a transparent cutting material having opposed faces, a transparency depicting an object, means to project said transparency on one face of said cutting material, and a router actuated in three dimensions positioned to rout the projection of such transparency directly on the other face of said cutting material.

4. A three-dimensional opto router comprising a transparent cutting material having a first face and an opposed face, a transparency depicting an object aligned with said cutting material, a projection system for projecting said transparency upon said first face, and a router having linkages providing movement in $x$ and $z$ senses relative the plane of said opposed face and movement in the $y$ sense relative said opposed face to rout the projection of said transparency directly on said opposed face.

5. A three-dimensional opto router comprising a transparent cutting material having a first face and an opposed face, a transparency depicting an object such as a map aligned with said cutting material, a collimating lens mounted adjacent said transparency, a projection system spaced from said collimating lens for projecting a source of light through said lens and then through said transparency upon said first face, and a router having linkages providing movement in $x$ and $z$ senses relative the plane of said opposed face and movement in the $y$ sense relative said opposed face to rout the projection of said transparency directly on said opposed face.

6. The combination of claim 5 wherein said lens is sandwiched by transparent reflection-reducing coatings.

7. The combination of claim 5 wherein the opposed face of said cutting material carries a translucent coating.

8. The method of producing a three dimensional representation of a two dimensional object comprising projecting a collimated image of said object upon a face of a transparent material and routing in the face of said material opposite the face into which said object is projected along paths corresponding to the salient features of the object delineated.

9. The method of producing a three dimensional representation of a two-dimensional object comprising the steps of projecting a collimated image of said object upon the face of a transparent material, frosting the opposite face of the transparent material so that the collimated image of the object is visible thereon and routing in said frosted face along paths corresponding to the salient features of the object delineated.

References Cited in the file of this patent

UNITED STATES PATENTS

| | | |
|---|---|---|
| 1,223,539 | Vandal | Apr. 24, 1917 |
| 1,393,255 | Wenschow | Oct. 11, 1921 |
| 1,801,200 | Howell | Apr. 14, 1931 |
| 2,047,013 | Dorn | July 7, 1936 |
| 2,374,981 | Cooke | May 1, 1945 |
| 2,410,447 | Juran | Nov. 5, 1946 |
| 2,560,658 | Pareto | July 17, 1951 |
| 2,643,576 | Merriam | June 30, 1953 |